(12) United States Patent
Seeler

(10) Patent No.: US 7,676,743 B2
(45) Date of Patent: Mar. 9, 2010

(54) APPLYING TYPE FITTING ACROSS GROUPED TEXT FRAMES IN A PAGE LAYOUT APPLICATION

(75) Inventor: Rick S. Seeler, Scotts Valley, CA (US)

(73) Assignee: Adobe Systems, Incorporated, San Jose, CA (US)

( * ) Notice: Subject to any disclaimer, the term of this patent is extended or adjusted under 35 U.S.C. 154(b) by 378 days.

(21) Appl. No.: 10/999,599

(22) Filed: Nov. 30, 2004

(65) Prior Publication Data

US 2006/0117255 A1    Jun. 1, 2006

(51) Int. Cl.
*G06F 17/00* (2006.01)
(52) U.S. Cl. .................. 715/243; 715/244; 715/249; 715/252; 715/255; 715/273; 715/277
(58) Field of Classification Search .................. 715/507, 715/508, 518, 524, 221, 223–226, 243–244, 715/249, 252, 255
See application file for complete search history.

(56) References Cited

U.S. PATENT DOCUMENTS

| | | | | |
|---|---|---|---|---|
| 6,055,550 | A * | 4/2000 | Wallack | 715/509 |
| 6,161,114 | A * | 12/2000 | King et al. | 715/517 |
| 6,243,721 | B1 * | 6/2001 | Duane et al. | 715/505 |
| 6,256,650 | B1 * | 7/2001 | Cedar et al. | 715/235 |
| 7,212,309 | B1 * | 5/2007 | Sellers et al. | 715/234 |
| 2002/0051208 | A1 * | 5/2002 | Venable | 358/1.18 |
| 2004/0177316 | A1 * | 9/2004 | Layzell et al. | 715/500 |
| 2006/0103667 | A1 * | 5/2006 | Amit et al. | 345/619 |
| 2006/0112333 | A1 * | 5/2006 | Iwanaga | 715/531 |

FOREIGN PATENT DOCUMENTS

EP      929184 A2 *  7/1999

OTHER PUBLICATIONS

U.S. Appl. No. 60/622,585.*
Joe Geigel and Alexander Loui, "Automatic Page Layout Using Genetic Algorithms for Electronic Albuming", Jan. 21-26, 2001, Proceedings of Electronic Imaging, pp. 1-12.*
D. F. Wong and C. L. Liu, "A New Algorithm for Floorplan Design", 23 rd Design Automation Conference, IEEE 1988, pp. 101-107.*

(Continued)

*Primary Examiner*—Laurie Ries
*Assistant Examiner*—Chau Nguyen
(74) *Attorney, Agent, or Firm*—Robert C. Kowert; Meyertons, Hood, Kivlin, Kowert & Goetzel, P.C.

(57) ABSTRACT

Methods are disclosed for type-fitting text in multiple text frames of a page layout application. The text frames are associated with a group, and permissible variances of parameters of type fitting attributes are assigned to the group using a graphical user interface. In one embodiment, to type-fit the text, a best-individual-fit setting for the text of each text frame is first individually assessed to determine parameters of the attributes that would result in the text substantially fitting within its associated text frame. Thereafter, one best-group-fit setting for all frames in the group is determined by sorting through the best-individual-fit settings for each of the frames to determine which frame's best-individual-fit parameters results in the highest degree of text shrinkage or the least degree of text expansion. In accordance with this embodiment, the frames, when fitted, will be uniformly scaled in accordance with a scaling factor.

110 Claims, 10 Drawing Sheets

OTHER PUBLICATIONS

J. P. Cohoon, S. U. Hegde, W. N. Martin, and D. Richards, "Floorplan Design Using Distributed Genetic Algorithms", IEEE 1988, pp. 452-455.*

"Meadows DesignMerge Technical Bulletin," obtained from http://www.meadowsps.com/site/marketing/techbulletines/TB-1.html, dated Feb. 2003, 3-pgs.

"Database Publishing & XTensions for QuarkXPress," obtained from http://www.meadowsinfo.com/pubsolutions/designmerge_detail.htm, undated, generated Nov. 30, 2004, 6-pgs.

"Quark Xtensions Catalog Description," obtained from http://www.quark.com/products/xpress/xtensions/xt_description.cfm?XTID=2021, undated, generated Oct. 4, 2004, 1-pg.

* cited by examiner

APPLYING TYPE FITTING ACROSS GROUPED TEXT FRAMES IN A PAGE LAYOUT APPLICATION

FIELD OF THE INVENTION

The present disclosure relates to a method and apparatus for grouping multiple text frames in a page layout application and for uniformly applying type fitting across the grouped text frames.

BACKGROUND OF THE INVENTION

A number of page layout applications are known in the art, such as Adobe InDesign®, Adobe PageMaker®, and QuarkXPress®. When using a page layout application, text can be input into a plurality of text frames, which are simply regions or boxes in the page layout. Typically, the text frames have borders in which the text is contained and can be moved or otherwise manipulated in the application. Often, the user must modify attributes of the text in the text frames so that the text sufficiently fits within the text frame, such as point (font) size, leading (i.e., the spacing between lines of text), tracking (i.e., spacing between letter and words), kerning, spacing between paragraphs, spacing before and after text, vertical and/or horizontal scaling, etc. Modifying text attributes to fit the text in a text frame is often referred to as "type fitting" or "copy fitting," and current page layout applications offer various utilities to aid in type fitting. With these utilities, users must specify attributes of the text and preferred parameters of the attributes to be used when type fitting the text.

A commercial example of a prior art type-fitting system for a page layout application is the CopyFit™ XTensions module used in DesignMerge™. Referring to FIG. 1, an interface 100 is illustrated that is similar to the prior art CopyFit™ XTensions module, which may be used to type fit text within a text frame of a given size in a QuarkXPress™ page layout application. The interface 100 is used to fit and fix "overflow" or "underflow" of text within a text frame, i.e., conditions respectively where the text is too large to fit in the text frame ("overset") or where the text is too small and does not adequately fill up the text frame ("underset").

Non-optimized text fitting, and the manner in which interface 100 can be used to fix such problems, is shown first by reference to the exemplary text frames 200, 210, and 220 of FIG. 2A. As shown, text frame 200 is overset, while text frames 210 and 220 are underset. An overflow of text may occur when the text is imported or manually input into a text frame such that it is longer than the space allotted in the text frame, rendering some of the text non-visible within the frame (200). Likewise, an underflow of text may occur when the text as imported or input is shorter than the space allotted in the text frame (210, 220), in which case empty space follows the text within the frame. The user in these circumstances can make the text fit within the text frames 200, 210, and 220 by modifying the sizes of the text frames, but this may not be desirable or possible in all circumstances. For example, a page layout (e.g., for a brochure or newspaper) may have several text frames carefully laid out on one or more pages and interspersed among pictures, drawings, logos, or other graphics, such that changing the sizes of text frames would not be practical as this would tend to alter the interrelations of the graphical elements and hence the entirety of the page layout.

Because the user may not wish to change the size of a text frame or frames, the user can access the interface 100 of FIG. 1 to change attributes of the text so that the text can be made to fit the text frame(s). In this regard, interface 100 includes a set of attributes 110 for type fitting text in a text frame, such as those discussed earlier. Each attribute 110 is defined with minimum and maximum values for the parameters 112, 114 by which the attribute 110 can be automatically adjusted in accordance with an algorithm implemented by the interface 100. Each attribute 110 is also defined by a step value 116 to set the gradations by which the attribute 110 may be changed. Also present is a priority 118 which the algorithm uses to preferentially adjust the parameters. For example, as shown in FIG. 1, in the case of an non-optimized fit, the algorithm would first adjust the tracking to see if a proper fit can be achieved within its prescribed parameters; if not, the horizontal scaling would similarly be adjusted; followed by the point size, etc. The parameters 112, 114, steps 116, and priorities 118 are user-definable, and may be typed into the interface 100 or loaded in as a pre-stored template of parameters using drop down menu 102. As one skilled in the art will recognize, the algorithm can be iterative in nature to find a most optimal fit even when priorities are specified, and can be achieved in any number of ways.

To type fit text, the user selects the text frame in the page layout application and then brings up (in any number of ways) the interface 100. The selected frame to be fitted is then displayed in interface 100 as entry 101, and thereafter the user enters or loads (102) the parameters 112, 114, step 116, and priority 118 for the type-fitting attributes 110 to be used on the selected frame. Thereafter, the user can engage the algorithm to apply the parameters to the text frame to fit the text by selecting the "fit frame" button 120. The user can also "tag" the selected text frame 104 with a particular parameter set 102 without applying the same via the button 120. This is useful when the user knows a certain frame needs a particular set of attributes and parameters for type fitting the text, but it is not yet useful to actual fit the text of the frame, for example, because the sizes or locations of the text frames are still being altered in the page layout application. Such "tagging" can also be removed (108) or read (106) to understand or perhaps modify the parameters associated with the frame 101.

FIG. 2B shows the text frames 200-220 after each has been subject to the type fitting attributes, parameters, steps, and priorities shown in FIG. 1 (i.e., "Set 1" from box 102 in FIG. 1). Thus, in accordance with the type fitting algorithm, it can be seen that the text in text frame 200 has been type fit by changing the font size of the text from 12.0 to 9.5 (a 20.8% decrease); text frame 210 has been type fit by changing the font size from 12.0 to 13.0 (a 8.3% increase); and text frame 220 has been type fit by changing the font size from 16.0 to 18.6 (a 16.3% increase). Thus, the independently type-fit text frames 200, 210, and 220 of FIG. 2B, although they have each been type fit, are not scaled uniformly by the algorithm, which is not surprising as the algorithm does nothing to take the attributes and parameters of another text frame not currently being set into account. Of course, other type fitting attributes (e.g., tracking) may also have been changed in a non-uniform manner, but this is not shown in the FIG. 2 for clarity.

Non-uniform scaling can be troubling to the user. For example, suppose that text frame 220 represents the title of a story, text frame 200 represents a subtitle of the story, and that frame 210 contains the actual text of the story (which may or may not continue in a different column on a subsequent page in the page layout). The user might have determined while entering the text that the title, subtitle, and story text as put in the frames looked pleasing in relation to one another: i.e., the subtitle and the story text look sensible when written in the same font size, while the title is sensibly a little bigger than both. However, applying the same type fitting attributes and parameters (i.e., "Set 1" in box 102) to each frame independently produces the non-scaled changes in font size discussed above (and perhaps other attributes) between the text frames 200-220. Thus, the subtitle in frame 200 is now considerably smaller than the story text in frame 210, a potentially odd-looking result.

Because of this problem, the user may be relegated to a frustrating and complicated iterative process where the user has to modify the type fitting attributes and parameters manually for each frame (perhaps using another user interface (not shown) which displays the actual value for the attributes of the text, as opposed to potential parameters or ranges of the attributes as in interface 100). Of course, as attribute parameters for one (first) frame are manually changed, another (second) frame may need to be similarly changed if uniform or near-uniform scaling is desired. However, such a change may not be permissible in the second frame (e.g., it might result in an overset condition), thus requiring the user to go back to the first frame to investigate whether modifying different attribute parameters can be changed in both the first and second frames, hoping that such a modification will be acceptable in some other related (third) frame, etc. When dealing with multiple frames and multiple attributes, such manual "tweaking" can be a very complex task, especially when there are multiple font sizes or other attributes present in a single frame, or across multiple frames. As a result, much of the benefit of the interface 100, and the algorithm it promotes, are lost.

The subject matter of the present disclosure is directed to addressing these and other problems.

SUMMARY OF THE DISCLOSURE

Methods are disclosed for type-fitting text in multiple text frames of a page layout application. The text frames are associated with a group, and permissible variances of parameters of type fitting attributes are assigned to the group using a graphical user interface. In one embodiment, to type-fit the text, a best-individual-fit setting for the text of each text frame is first individually assessed to determine parameters of the attributes that would result in the text substantially fitting within its associated text frame. Thereafter, one best-group-fit setting for all frames in the group is determined by sorting through the best-individual-fit settings for each of the frames to determine a setting for the fitting group that, when applied to all of the frames of the fitting group, will achieve uniform type fitting of the group. More specifically, the now-optimized frames are compared to determine which frame's best-individual-fit parameters result in the highest degree of text shrinkage or the least degree of text expansion, with such best-individual-fit parameters being selected as the best-group-fit setting for all frames in the group. In accordance with this embodiment, the frames, when fitted, will be uniformly scaled in accordance with a scaling factor. In an additional embodiment, the values for the parameters for the now-grouped and now-fitted frames can be changed in one frame, with such changes rippling through the other frames to modify that value in a scaled fashion.

The foregoing summary is not intended to summarize each potential embodiment or every aspect of the present disclosure.

BRIEF DESCRIPTION OF THE DRAWINGS

The foregoing summary, preferred embodiments, and other aspects of subject matter of the present disclosure will be best understood with reference to a detailed description of specific embodiments, which follows, when read in conjunction with the accompanying drawings, in which.

Figure 1:
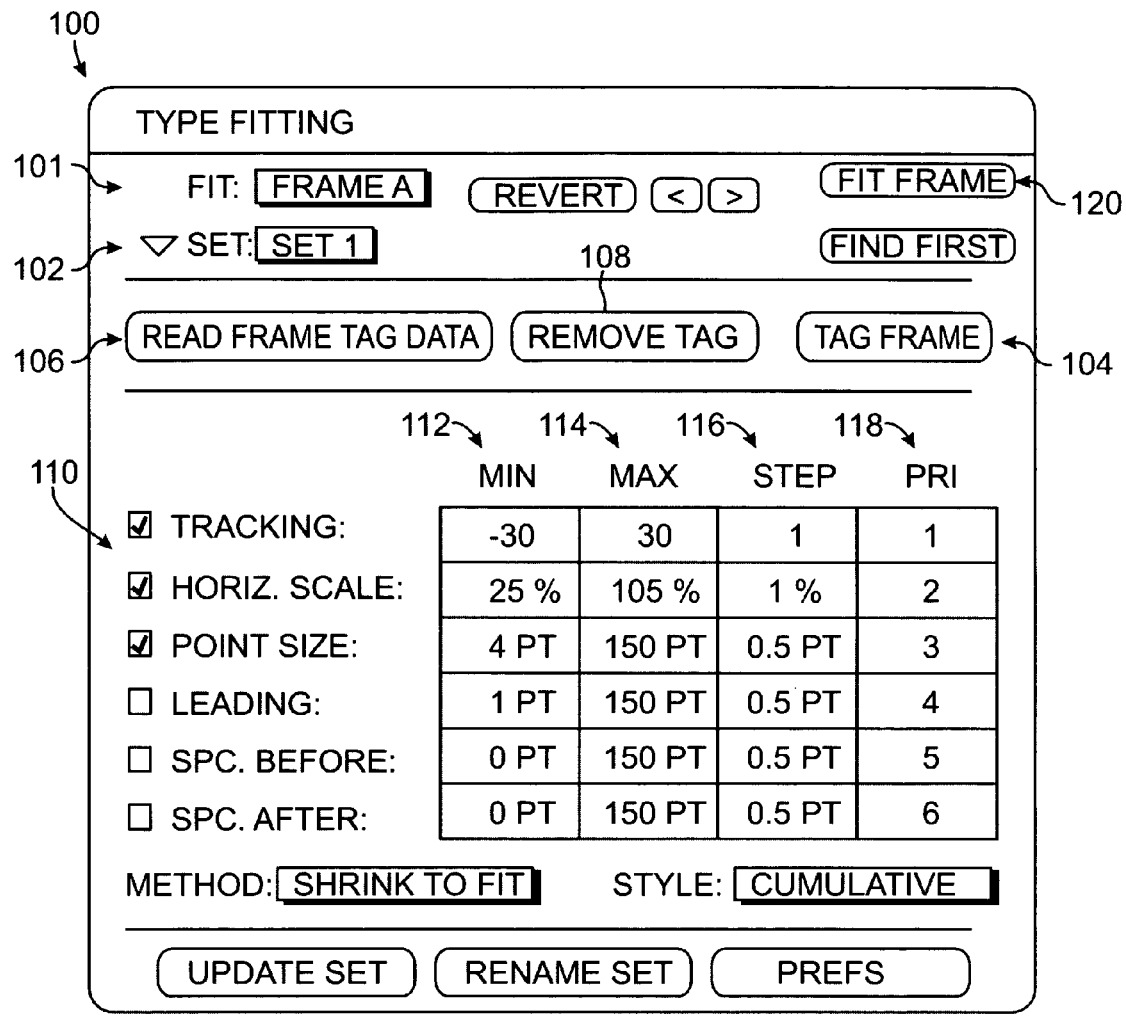
FIG. 1 illustrates an interface for type fitting text in a text frame according to the prior art.

While the disclosed techniques are susceptible to various modifications and alternative forms, specific embodiments are shown by way of example in the drawings and are herein described in detail. The figures and written description are not intended to limit the scope of the inventive concepts in any manner. Rather, the figures and written description are provided to illustrate the inventive concepts to a person skilled in the art by reference to particular embodiments, as required by 35 U.S.C. § 112.

DETAILED DESCRIPTION

Figure 3A:
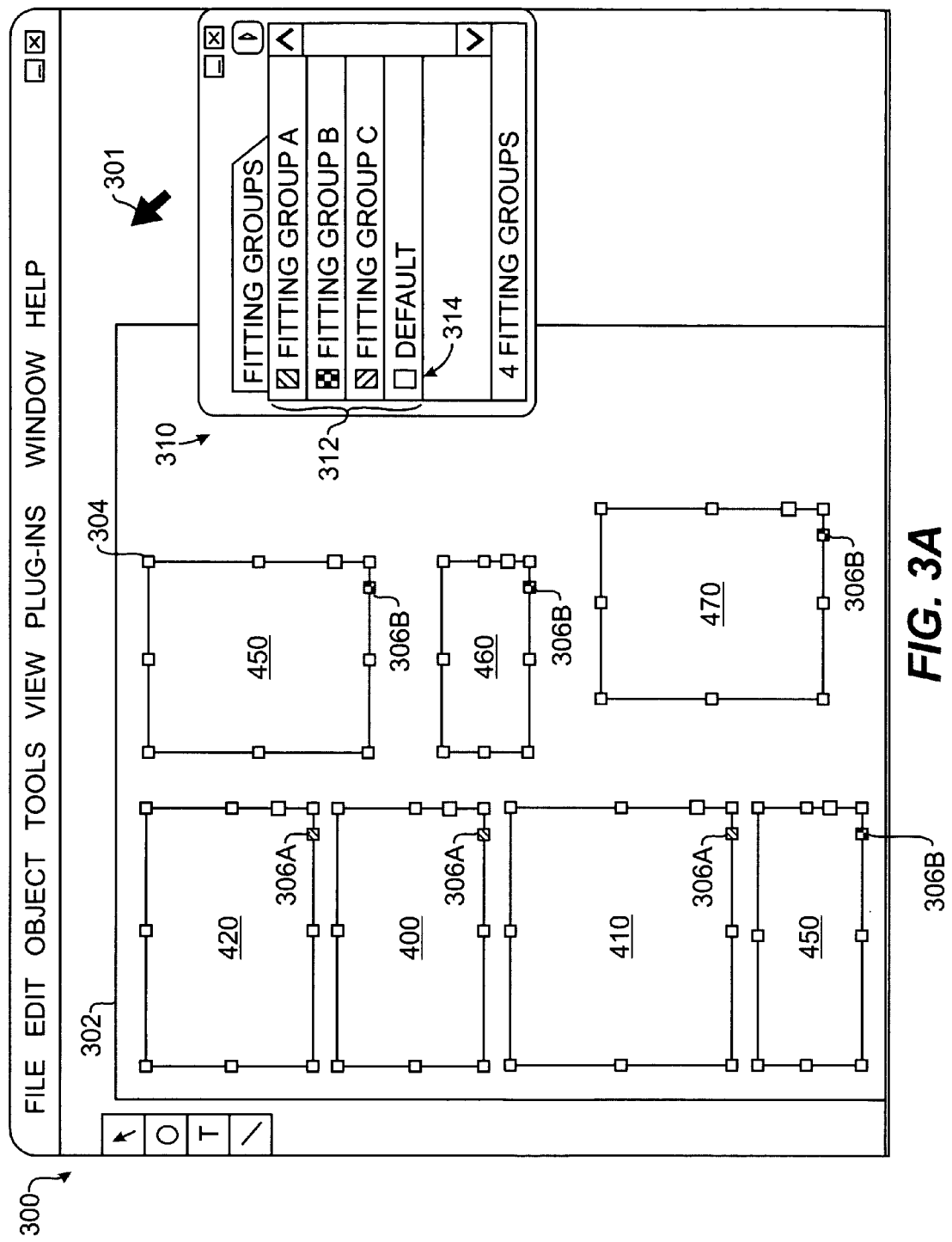
FIG. 3A illustrates an exemplary screen of a page layout application having a plurality of text frames and an embodiment of an interface for handling various fitting groups.

Referring to FIG. 3A, an exemplary screen 300 of a page layout application is illustrated having a plurality of text frames 400-470 arranged on an electronic page layout or document 302. In one embodiment, the problems of the prior art are mitigated by allowing related text frames to be grouped for type fitting optimization. Once grouped, permissible parameters for type fitting attributes can be selected by the user using an user interface 350 (discussed below with reference to FIG. 3B), which attributes and parameters are exported to a type fitting algorithm (discussed below with reference to FIGS. 5-7). The type-fitting algorithm, when applied to the grouped frames, takes into account all of the grouped text frames to deduce a fitting solution that is uniformly scaled and acceptable for each of the grouped frames. In this way, and according to this embodiment, attributes for the text in each of the grouped text frames are uniformly scaled to preserve the user's original preferences.

A user can group related text frames together into fitting groups in any number of ways from within the page layout application, and one such way is illustrated with respect to FIG. 3A, which shows a fitting group palette or dialog box 310. The dialog box 310, when opened and viewed in conjunction with the frames 400-470 in the page layout application, allows a user to view various fitting groups 312 to be used with the frames in the application. The dialog box 310 displays the names of the fitting groups and displays colors associated with the fitting groups for reasons to be explained below.

Although not shown in FIG. 3A, the user can associate a text frame with a fitting group in any number of ways in the page layout application. For example, the user can highlight a text frame by selecting it with a mouse pointer 301 and then access a drop down menu or other interface to add the highlighted text frame to a fitting group: Each frame of interest can be individually associated to an appropriate group one by one, or multiple frames can be selected and associated together as a group. Of course, other means can be used to associate the frames into groups.

Once text frames are associated with a group, it is useful to provide the user a visual cue to allow the user to understand which frames in the page layout 302 are grouped. Color is a useful indicator, and as shown in FIG. 3A, those text frames grouped together into a fitting group are in one embodiment provided with different colored borders 306. Specifically, as shown, text frames 400-420, corresponding to "fitting group A," are provided with a first colored border 306A, while frames 450-470, corresponding to "fitting group B," are provided with a second colored border 306B. (Also illustrated in FIG. 3C are anchors 304, which allow the user to manually change the size of the text frames 400-470 with a mouse pointer 301, for example. Of course, it may be undesirable to change the size of the text frames to fit the text for reasons noted previously).

Figure 3B:
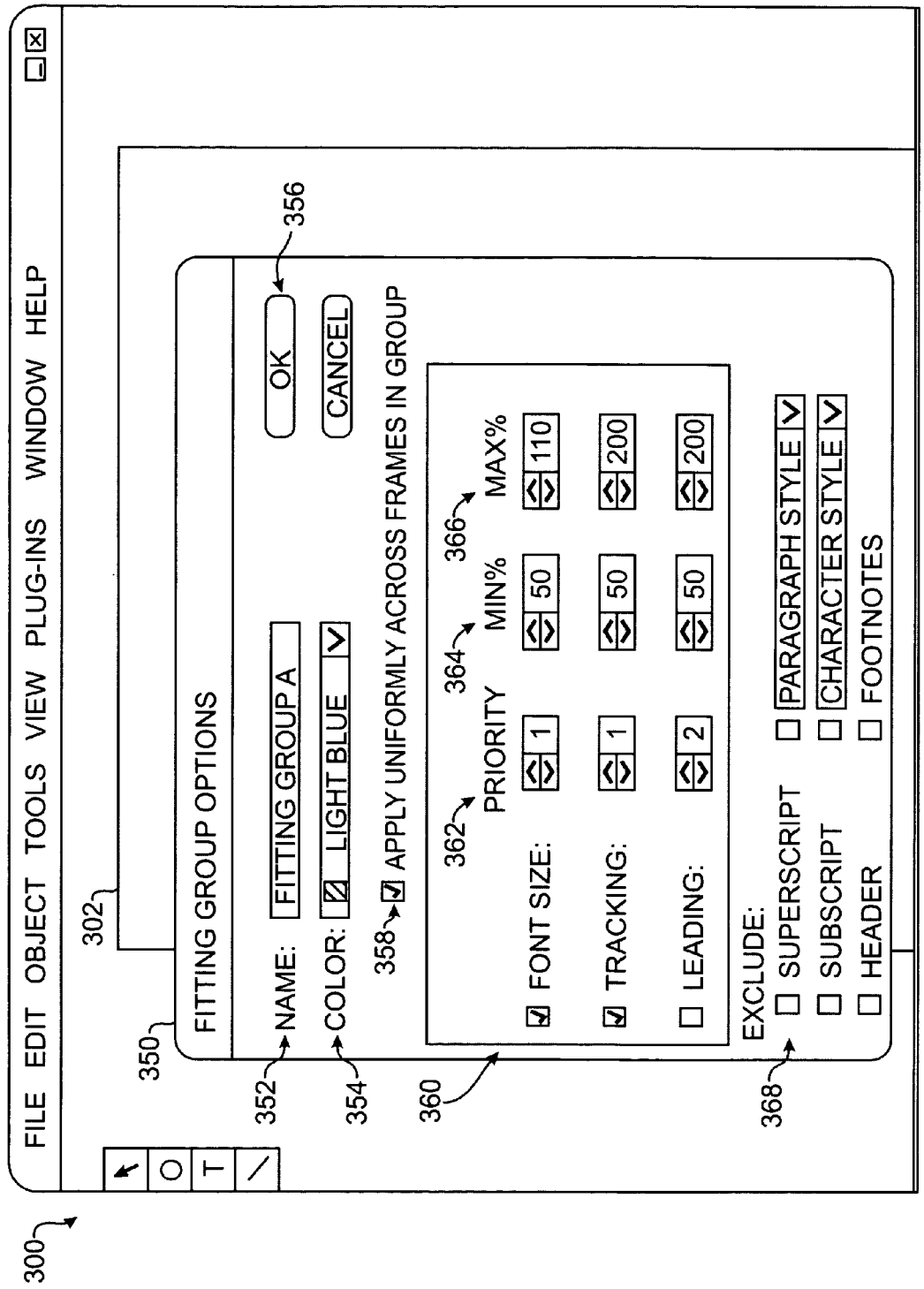
FIG. 3B illustrates an embodiment of an interface for defining fitting options of a fitting group in the page layout application.
Figure 3C:
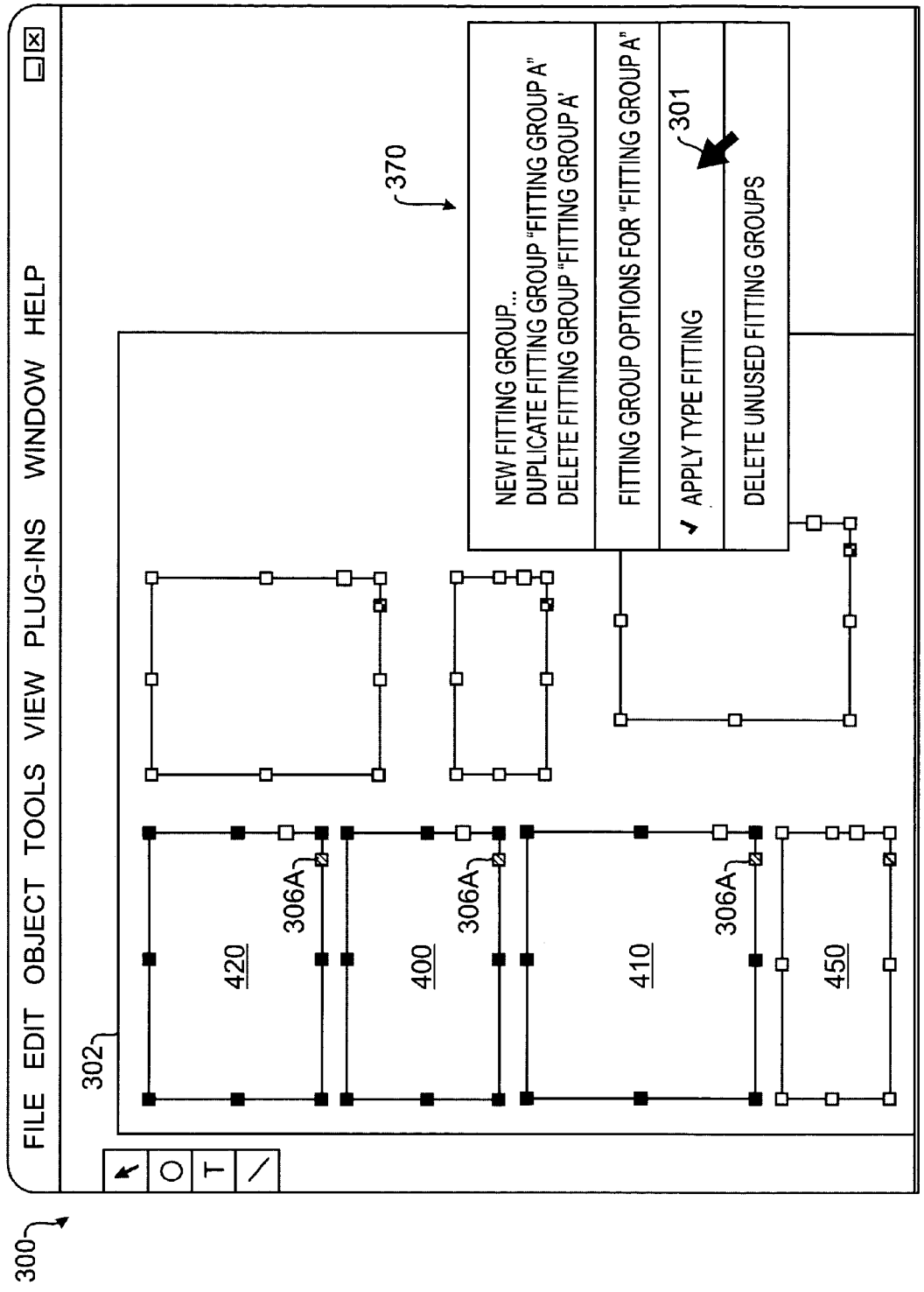
FIG. 3C illustrates a dropdown interface for accessing various operations of the page layout application pertaining to the fitting groups.

When creating or modifying a fitting group, the user accesses a fitting group option user interface 350 shown in FIG. 3B useable in conjunction with an embodiment of the invention. The user can access the interface 350 by any number of ways in the page layout application. In this regard, interface 350 can be displayed in any number of ways. For example, a fitting group (or a frame within the group) can be selected with a mouse pointer 301 from within the page layout application, and either a double click, a right mouse button click, a button on the toolbar, a menu selection from a drop down menu in a toolbar, etc., can be used to bring interface 350 into view. The interface 350 may also be selectable by selecting a fitting group from the fitting group dialog box 310 (FIG. 3A). Preferably, the interface 350 comprises a pop-up window overlaid onto the page layout 302 being displayed. Again, these means of displaying interface 350 are merely exemplary, and can be achieved in other ways, as one skilled in the art will appreciate.

Interface 350 is similar in many respects to the interface 100 of FIG. 1. Specifically, like interface 100, interface 350 includes the ability to select type fitting attributes 360 with a check box and to specify parameters 364, 366 by which the selected attributes 360 can be changed while optimizing type fitting through the use of the disclosed algorithm (to be explained later). In interface 350, only a few type-fitting attributes 360 are shown for clarity, but it should be understood that additional type fitting attributes such as those noted earlier can be displayed as well. Also in interface 350, minimum and maximum allowed parameters or deviations 364, 366 from the current values of the text's attributes 360 for the frames in the group are expressed as percentages or proportions, although ranges could be used to the same effect. Also included is the ability to select a priority 362 for the attributes 360 to prioritize those attributes 360 which the algorithm will preferably seek to first change in its attempt to optimize text fitting. Other details from interface 100 that may also be useful in interface 350 are omitted for clarity to focus on the differences between the two interfaces, although it should be understood that interface 350 can include those features of interface 100 discussed earlier. For example, features allowing for management of the fitting groups (e.g., deleting, merging, copy, editing, etc.) are not shown.

In interface 350, the group can be named within box 352. The colors for the fitting group can be automatically provided by the page layout program, but in one embodiment, the color can also be made selectable by the user from the interface 350 as shown in FIG. 3B. Specifically, a drop down menu 354 allows the user to selected a color for the fitting group presently selected (352). Alternatively, the colors associated with each fitting group can also be made selectable from the fitting group dialog box 310 of FIG. 3A. Needless to say, other visual cues could be provided to indicate to the user which frames correspond with particular fitting groups, such as by shading, by the provision of different line style for the borders, etc.

The central difference between interface 100 and interface 350 is the latter's allowance to specify the fitting attributes to a plurality of frames at the same time. This is achieved by allowing the user to group the various related frames together in a fitting group, such as fitting group A of FIG. 3A, which includes text frames 400, 410, and 420. Once the user selects the attributes 360 and defines parameters and priorities 362-366 for the various attributes 360 that the fitting algorithm can apply to the frames in the fitting group, the user selects "OK" 356 in the interface 350. Then, the attributes 360, priority 362, parameters 364, 366, etc. of the group are stored as part of a template associated with the page layout application, and other text frames can be added to or removed from the existing fitting group.

After creating the fitting group and associating text frames to the group, uniform-scaled type fitting for the frames in the fitting group can commence in any number of ways from the page layout application, such as by a menu operation, a drop down menu, an "apply" button analogous to the "fit frame" button 120 of FIG. 1, etc. For example, FIG. 3C shows a dropdown interface 370 for performing various useful operation, such as creating a new fitting group, duplicating a selected fitting group, deleting a selected fitting group, accessing the options interface 350 for the selected fitting group, and applying type fitting to selected frames or fitting group.

Figure 4A:
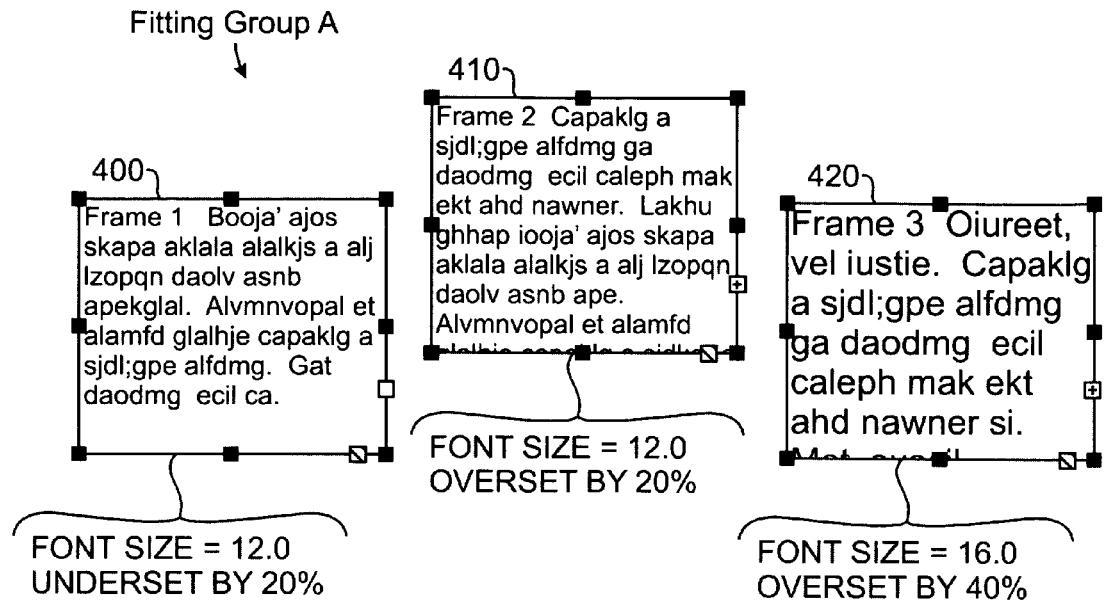
FIGS. 4A-4B illustrate exemplary text frames before and after uniform scaled type fitting according to an embodiment of the present disclosure.
Figure 4B:
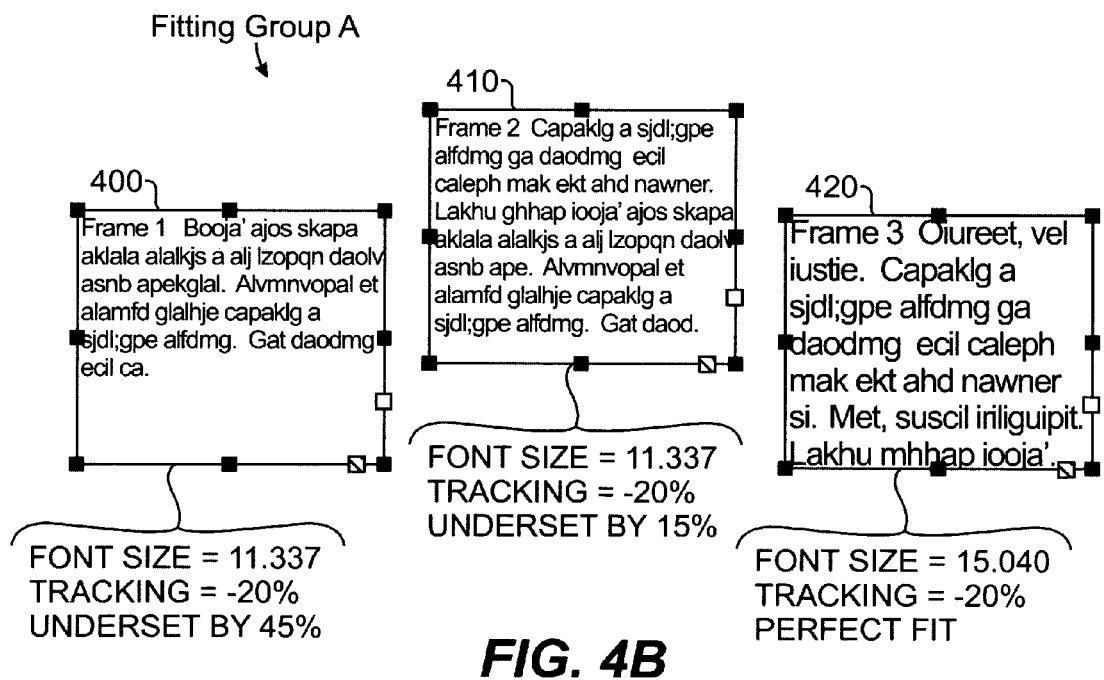

Before discussing the details of the type-fitting algorithm, functional operation of the algorithm is illustrated with respect to FIGS. 4A and 4B, which show exemplary text frames 400, 410, and 420 of a fitting group before and after type fitting is affected. In FIG. 4A, text has been entered or loaded into each of the exemplary text frames 400, 410, 420, which have been associated into fitting group A using the techniques just described. Prior to type fitting, text frames 400 and 410 have a font size of 12.0, and text frame 420 has a font size of 16.0. Each text frame 400-420 also has the same tracking value. Text frame 400 is underset by 20 percent, text frame 410 is overset by 20 percent, and text frame 420 is overset by 40 percent. If the text in these text frames 400-420 were type fit separately as in the prior art, the type fitting attributes (e.g., font size, tracking) of the text would be changed by different proportions and the resultant text in the frames 400-420 would not have the same relative appearance (see FIG. 2B). However, when the frames 400-420 are grouped and type-fit according to the disclosed algorithm, uniform scaling of these parameters is affected, as shown in FIG. 4B. Thus, the font size for each frame 400-420 has been uniformly reduced by about 6% from its original values, and the tracking in each text frame has been uniformly reduced by 20%, preserving the relative appearance of the text in these grouped frames. In other words, scaling factors of 6% for the font size and 20% for tracking have been determined as optimal by the algorithm. In addition, all of the text substantially fits within in its associated text frame 400-420, with no overset. The result is a more pleasing or sensible appearance of the text in the frames, without the need to manually modify the various attributes and parameters for each frame in a complicated and iterative fashion.

As noted earlier, the priority values 362 (FIG. 3B) assist the algorithm in type fitting the text by specifying an order by which the algorithm can attempt to adjust the text to achieve a suitable fit. Thus, as dictated by the set priority, more than one type-fitting attribute 360 (FIG. 3B) can be modified together to type fit the text. Moreover, the algorithm can allow attributes 360 to be placed on equal footing from a priority standpoint, in which case the algorithm will attempt to concurrently adjust such attributes to achieve optimal fitting. For example, in FIG. 3B, the attributes 360 of font size and tracking are both checked and have a priority 362 of "1," allowing the algorithm to preferentially adjust either or both during type fitting. When more than one attribute 360 are modified together, the algorithm will preferably not simultaneously increase and decrease the extent of the text.

In one embodiment, the type fitting techniques of the present disclosure are applied to fit all text of the text frames in the fitting group being modified, regardless of the character styles, paragraph styles, etc., found within the text frames. However, in an alternative embodiment, certain styles, can be excluded from type fitting, such as character styles or paragraph styles, super- or subscripts, header, footers, footnotes, etc. In this way, text matching the excluded styles would not be modified during execution of the type-fitting algorithm. To so exclude a particular style, the fitting group option interface 350 of FIG. 3B can include one or more exclusion options 368. Such option 368 may be accompanied by multiple selection box as shown by which the user can select one or more styles to be excluded from type fitting.

Figure 5:
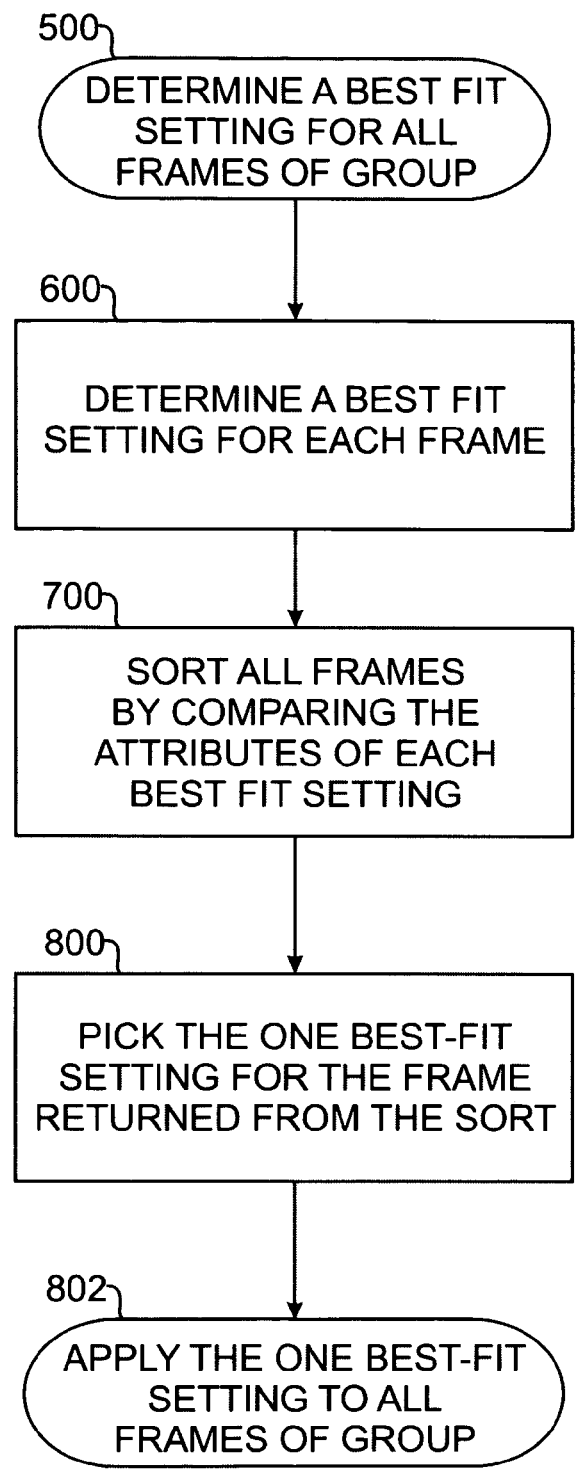
FIG. 5 illustrates an embodiment of an algorithm for uniformly type fitting text in a plurality of text frames of a fitting group according to an embodiment of the present disclosure.
Figure 6A:
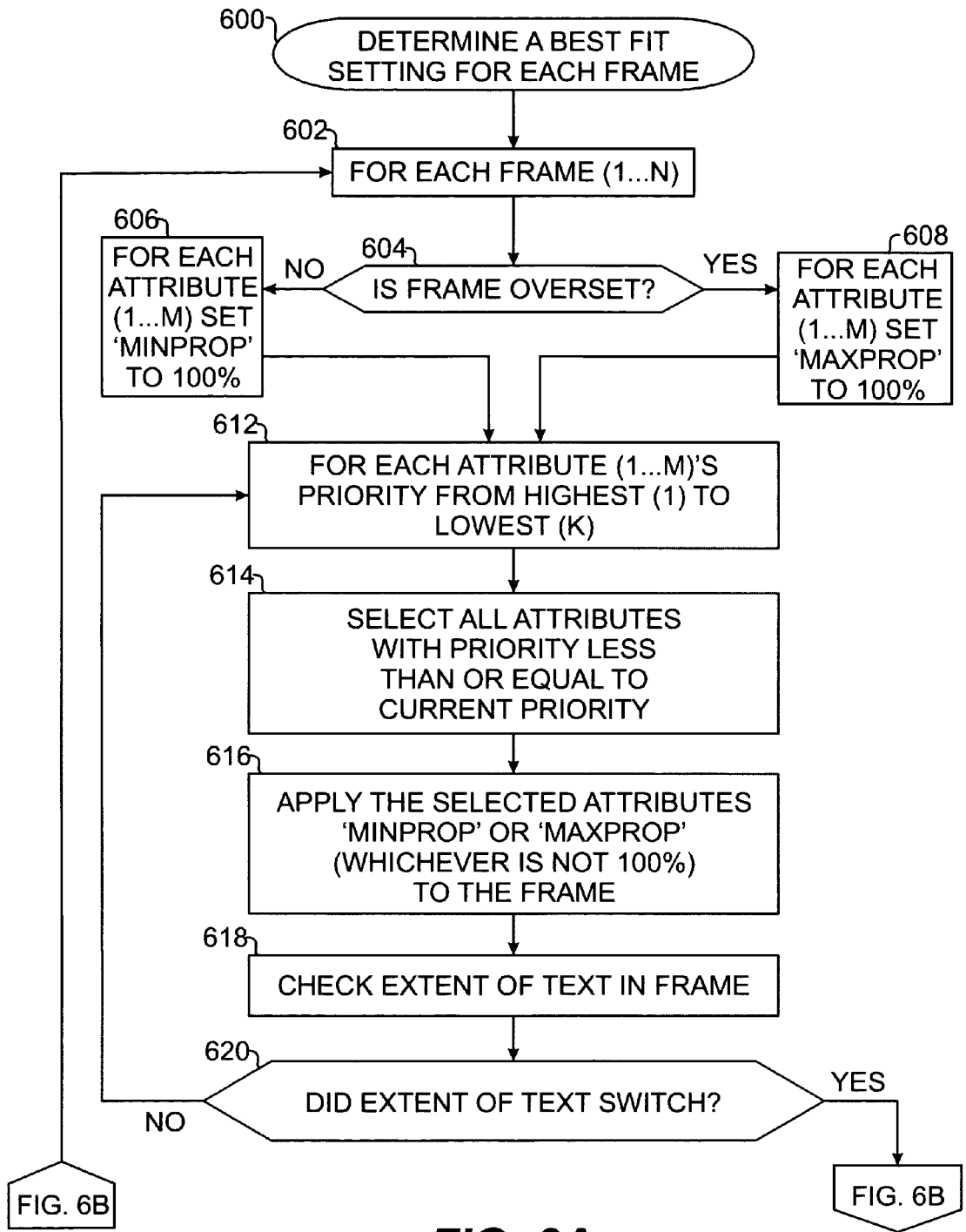
FIGS. 6A-6B illustrate further details of the algorithm of FIG. 5 pertaining to determining best-individual-fit settings for each text frame of a fitting group.
Figure 6B:
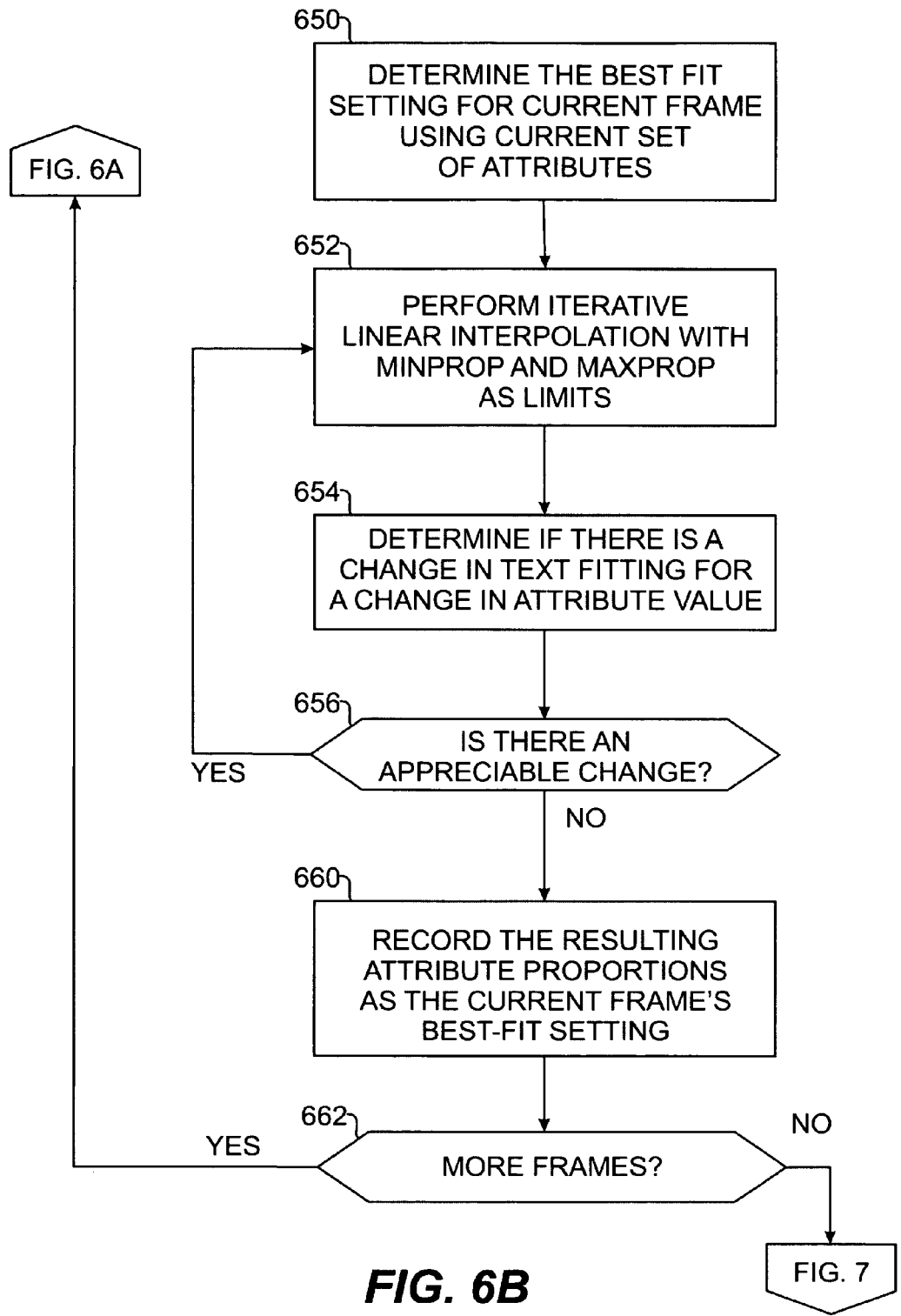
Figure 7:
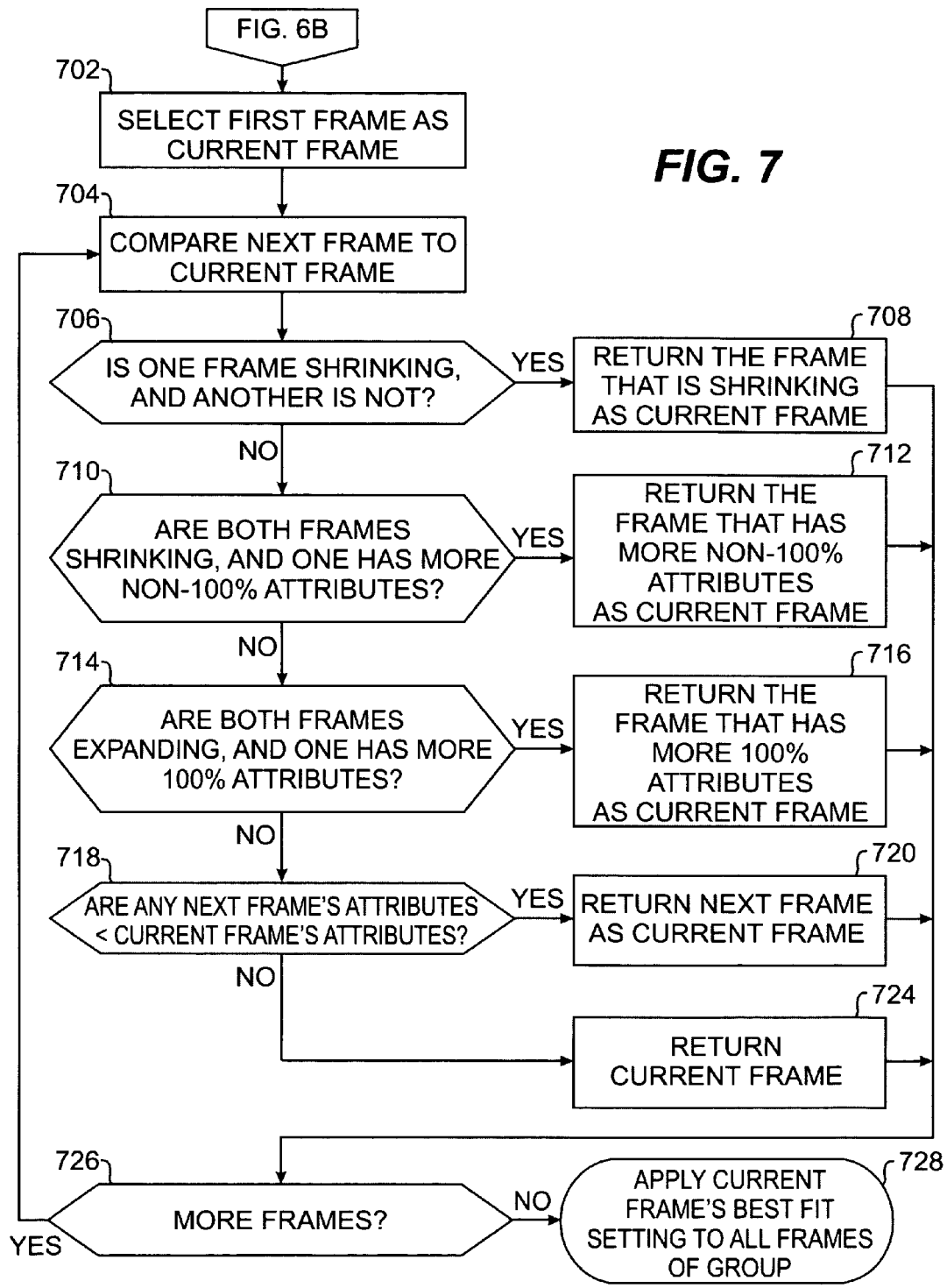
FIG. 7 illustrates further details of the algorithm of FIG. 5 pertaining to sorting the best-individual-fit settings for the text frames of a fitting group to determine one best-group-fit setting to apply to all the text frames of the fitting group.

An embodiment of the algorithm used to achieve the results illustrated in FIGS. 4A and 4B is shown in flow chart form in FIG. 5-7, with FIG. 5 describing the algorithm at a high level. As discussed above, the purpose of the algorithm is to determine a best-fit solution for all frames in a fitting group, most preferably in a fashion which maintains the proportionality of the current attributes of the text present in those frames. Most preferably, the algorithm determines a "best-group-fit" solution, i.e., one in which one frame's text is a "best-individual fit" (as defined below), and in which the other frames in the group are not overset. It should be noted that the disclosed embodiment is merely exemplary, and that other modifications could be made to the algorithm to achieve the goal of type fitting between the various frames in the fitting group. Moreover, because optimized fitting is subjective, other algorithms could be used to generally optimize fitting of the frames in the group without necessarily achieving a best-group-fit solution as defined above.

First, the algorithm separately determines a best-fit setting for the attribute values for each frame individually of the fitting group (Block 600), which is discussed in detail with reference to FIGS. 6A-6B. Most preferably, this first portion of the algorithm determines a "best-individual-fit" solution for each frame, i.e., one in which the text generally completely fills the space within its text box without overset. (Again, however, because optimized fitting is subjective, a particular frame can be individually optimized in its fit without necessarily achieving a best-individual-fit solution as defined above). Then, the algorithm sorts all the frames by comparing the best-individual-fit solutions (Block 700), which is discussed in detail with reference to FIG. 7. After sorting, the algorithm picks the one best-group-fit setting for the frame returned from the sort (Block 800). Finally, the algorithm applies the best-group-fit setting to all frames of the fitting group (Block 802).

FIGS. 6A and 6B show the steps for determining the best-individual-fit settings for each individual frame of the fitting group (600). The input for the present algorithm includes the various pieces of information input into interface 350 and other variables, including the number of frames (1 . . . N) in the fitting group, the number of attributes (1 . . . M) for the fitting group, the current value and priority of each attribute, and the permissible minimum and maximum deviations for each attribute (FIG. 3B, 364-366).

For each frame (1 . . . N) in the fitting group (Block 602), the algorithm first determines whether the current frame is overset (i.e., whether the text is clipped or cut off) (Block 604). If the present frame is not overset, the algorithm sets the minimum deviation for each attribute (1 . . . M) of that frame to one-hundred percent (Block 606), which will prevent the text in that frame from decreasing in size any further than its currently set values during later acts of the algorithm. If the present frame is overset, the algorithm sets the maximum deviation of each attribute (1 . . . M) to one-hundred percent (Block 608), which likewise prevents the text of that frame from increasing in size during later acts of the algorithm.

After fixing the proportions, the algorithm performs a loop (Blocks 612 through 620) to determine whether applying the minimum or maximum proportions of each attribute (other than those that are one-hundred percent) will switch the extent of the text from overset to underset or from underset to overset. Staring from highest to lowest priority for each attribute (1 . . . M) (or attributed if several have the same priority as mentioned above) (Block 612), the algorithm selects all attributes with priority less than or equal to the current priority (Block 614). For the selected attributes, the algorithm applies the minimum or maximum proportions (if not one-hundred percent) to the text of the text frame (Block 616). Preferably, the application of these proportions is not performed directly to the actual text in the text frames of the page layout (e.g., on screen), but instead is performed virtually as a storage copy of the text frames.

The algorithm then checks the extent of the text, i.e., whether it is overset or underset after application of the proportions (Block 618). More specifically, the algorithm determines whether (i) the text was originally overset and is now still overset or (ii) the text was originally underset and is still underset (Block 620). If the extent of the text did not switch, the algorithm returns to Block 612 to select the next highest priority attribute and runs through the looped execution of Blocks 614 through 620 again. If the extent of the text has switched at Block 620, the algorithm continues through acts illustrated in FIG. 6B.

To explain this procedure in further detail, considering the following simple example:

| Attribute | Priority | Minimum Proportion | Maximum Proportion |
| --- | --- | --- | --- |
| Font Size | 1 | 50 | 100 |
| Tracking | 2 | 50 | 100 |

In Block 612, the first highest priority attribute, "font size," is selected (Block 614), and at Block 616, the font size minimum proportion of 50% will be applied to the text of the frame (because it is not 100%). The extent of the text in the frame is then checked in Block 618. If reducing the font size by 50% does not change the frame from overset to underset or from underset to overset in Block 620, then the looped execution would repeat. In the next execution, starting again from Block 612, the next highest priority attribute, "tracking," is selected 614 along with "font size," which has a lower or equal priority (Block 614). In Block 616, the font size minimum proportion of 50% and the tracking minimum proportion of 50% will be applied to the text of the frame. The extent of the text in the frame is then checked in Block 618. If reducing the font size by 50% and the tracking by 50% does change the frame from overset to underset or from underset to overset in Block 620, then the loop will end and the algorithm will continue to FIG. 6B. On the other hand, if reducing the font size and the tracking by 50% does not change the frame from overset to underset or from underset to overset in Block 620, then the execution may terminate with an error because even the minimum proportions for the attributes are too restrictive and cannot change the extent of the text in the frame.

After determining the extent of text switching in FIG. 6A, the algorithm proceeds to the steps shown in FIG. 6B, where the algorithm determines the best-fit setting for each attribute determined in FIG. 6A found to switch the text from underset to overset or vice versa for the current frame (Block 650). This is preferably done using an iterative linear interpolation procedure (Block 652) to run through permissible deviations for particular proportions to see which will achieve the best fit for a particular frame, i.e., precisely where in the range of proportions of the attributes that the text for a particular frame is made to switch from underset to overset or vice versa. (Again, however, it is worth mentioning that because optimized fitting is subjective, other criteria could be used to determine the best fit for a particular attribute that does not require determining the exact point between underset and overset).

In accordance with the preferred embodiment, suppose the text in a particular frame occupies approximately 80% of its text frame, and that the font size (as an exemplary attribute) can deviate from 100% (no change; underset) to 200% (which would be overset, as determined in FIG. 6A). The basic goal is to determine where in the continuum between 100% and 200% that the text trips from underset to overset. In a conventional linear interpolation method, the midpoint between the two proportions, e.g., 150%, would be chosen and applied to determine whether the text would be overset. If so, 125% would be tried next; if not, 175% would be tried next, and so on. In a modification to this procedure, the estimated present extent of the text in the frame can be used to make this iterative process more efficient. Thus, if the text is approximately 80% of its text frame, i.e., is underset by 20%, an initial midpoint of 120% might be tried first as this would be near the expected trip point indicative of the best-fit setting for that particular attribute. Of course, other numerical method means of determining the optimal parameter value for each attribute can be used (e.g., binary searching).

At some point in the iterations of the linear interpolation method, the resulting changes in fit may become too small to warrant continuing the interpolation procedure. Accordingly, such changes in fit are monitored (Block 654), and assessed to see if the changes are suitably large to warrant further continuation of this procedure, for example by comparing the change to a preset threshold (Block 656). If so, then the linear interpolation continues (to Block 652); if not, the best fit parameter value for the attribute in question is deemed determined and is recorded (Block 660), and the process continues to Block 652.

At Block 662, it is determined whether further text frames in the fitting group need to be processed as set forth above. If so (i.e., if the Nth frame has not yet been reached), then the process continues back to Block 602 of FIG. 6A to determine the next frame's best-individual-fit setting.

Once all the best-individual-fit settings for each frame of the fitting group have been individually determined, the algorithm proceeds to the steps of FIG. 7, which show the portion of the algorithm used to determine the one best-group-fit setting to be applied to all of the frames in the fitting group. To summarize, at this point in the algorithm, each of the best-individual-fit settings for each frame in the fitting group have been separately determined, without consideration of any other frame's best-individual-fit setting. The goal of the algorithm depicted in FIG. 7 is to sort through the best-individual-fit settings for each of the frames to determine one best-group-fit setting for the fitting group that, when applied to all of the frames of the fitting group, will achieve uniform type fitting of the group. More specifically, the goal is to compare the now-optimized frames and to choose for the group the setting of a frame that has been most shrunk or least expanded from its original value, with the "most shrunk" or "least expanded" frame's best-individual-fit setting being chosen as the setting for type fitting all frames in the group. While not strictly necessary, this strategy is conservatively designed to ensure that whatever type fitting setting is ultimately chosen will not cause any particular frame's text to become overset.

This portion of the algorithm starts by selecting a first frame of the fitting group as the current frame (Block 702). Then, the algorithm compares the current frame to the next frame of the fitting group (Block 704) in various ways reflected in Blocks 706-722 to select the "most shrunk" or "least expanded" frame. Thus, as a first step, the current and next frames are compared to see if one's best-individual-fit settings (i.e., the attributes and best-fit values of those attributes that result in a best fit of the text in the frame) has caused the text in that frame to shrink while the other frame's best fit setting has caused the text in that frame to expand (Block 706). If so, the comparison returns the shrinking frame as the current frame for further comparison (Block 708).

Otherwise, if both frames are shrinking, the extent of change of the attributes is assessed for both the current and next frames to see which attributes in the frame had been earlier set to or remained at 100% (Block 710). From this assessment, the frame which has more non-100% attributes is chosen as the current frame (Block 712). For example, if a first frame has had its font size reduced to 65%, and its tracking reduced by 85%, while a second frame has had its font size reduced to 75% but its tracking was set at 100%, the first frame would be returned as the current frame because the first frame has two non-100% attributes which is greater than the one non-100% attribute of the second frame. Again, the rationale here is that frames having shrunken text with the largest number of non-100% attributes are most likely to constitute a solution which will not cause subsequent frames to become overset.

If both of the above comparisons have failed, the algorithm next determines if both frames are expanding, and assesses which of those frames has a higher number of 100% attributes (Block 714). From this assessment, the frame which has more 100% attributes (or conversely fewer non-100% attributes) is chosen as the current frame (Block 716). For example, if a first frame has had its font size increase to 125%, and its tracking increased by 135%, while a second frame has had its font size increased to 130% but its tracking was set at more than 100%, the second frame would be returned as the current frame because the second frame has more 100% attributes than the first frame. Again, the rationale here is that frames having expanded text with the largest number of 100% attributes are most likely to constitute a solution which will not cause subsequent frames to become overset because the expanding frame with the largest number of 100% attributes is the least expanding in comparison to other expanding frames.

If none of the foregoing conditions are true, the algorithm simply compares the best-individual-fit settings of the attributes for the current and next frames (Blocks 718) to choose that frame which has shrunk a particular attribute or attributes to the greatest extent (Blocks 720, 724). For example, if a first frame has had its font size reduced to 65%, and its tracking reduced by 85%, while a second frame has had its font size reduced to 75% and its tracking reduced by 85%, the first frame would be returned as the current frame. Likewise, if a first frame has had its font size increase to 130%, and its tracking increased by 135%, while a second frame has had its font size increased to 125% and its tracking increased by 135%, the second frame would be returned as the current frame.

At the end of the algorithm, and once all frames have been compared as set forth above, that remaining current frame's best-individual-fit setting is chosen as the one best-group-fit setting to be uniformly applied to all frames in the fitting group (Block 728).

Figure 2A:
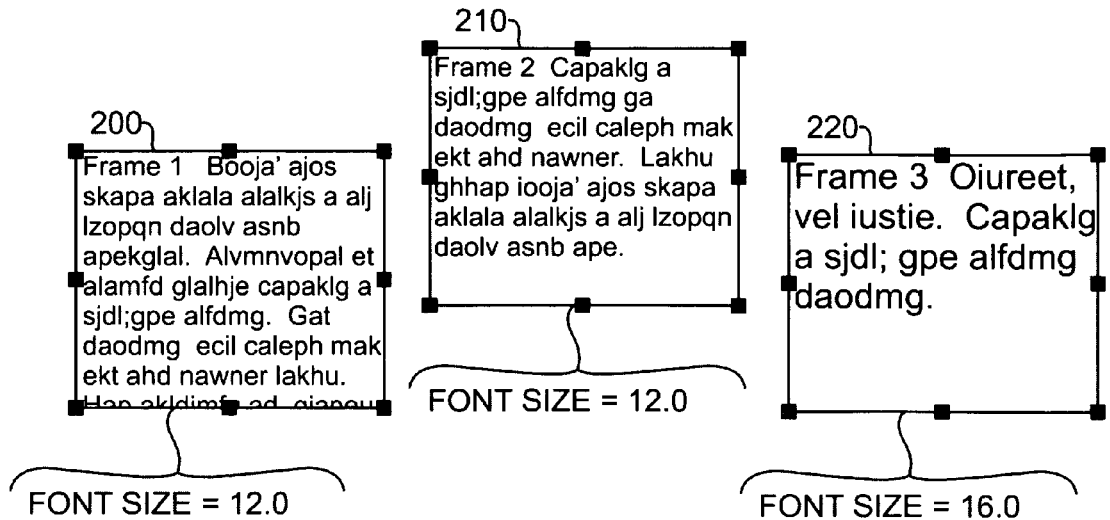
FIGS. 2A-2B illustrate exemplary text frames before and after type fitting text according to the prior art.
Figure 2B:
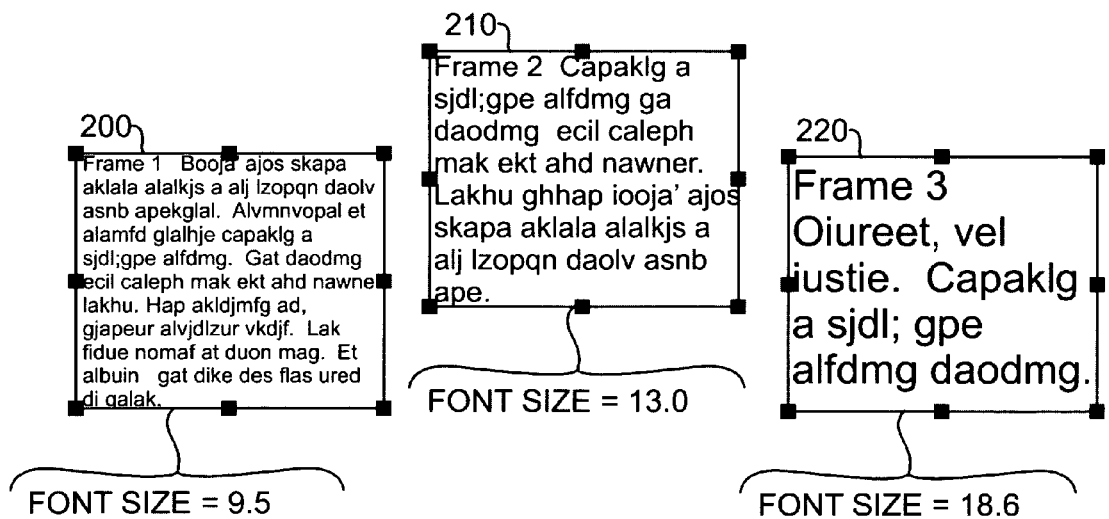

While it is preferred to uniformly scale the type fitting setting between the grouped frames for the reasons stated earlier, uniform scaling is not required in all useful embodiments. In some circumstances, it may merely be desirable to achieve best-individual-fit settings for each frame in the fitting group, i.e., as illustrated in FIG. 2B from the prior art. For example, if frames 200-220 are not related (e.g., as a title, subtitle, and text), the goal of type fitting may merely be to have each frame fitted so that the text fills the frame to the greatest extent possible without overset. In other words, uniform scaling of the type fitting parameters may not be necessary in such an embodiment. As far as is known, the prior art summarized in the Background section does not allow the frames to be designated into a group as disclosed herein. Of course, such grouping provides substantial benefits, as the user can manage (e.g., name, store, etc.) the defined fitting groups in the various ways set forth earlier. Moreover, once grouped, changes in a particular frame's type fit settings will have effect on the other frames in the group, as explained in further detail below.

The disclosed technique is easily modified to achieve individualized fitting of each of the frames in the group, and one means to so modify is shown in the fitting group option interface 350 of FIG. 3B. Specifically, in FIG. 3B, a selection box 358 is provided in the interface 350, which allows the user to choose whether type fitting parameters of the grouped frames are to be deduced and applied across all frames to achieve uniform scaling (as discussed in the bulk of this disclosure), or whether the grouped frames are to be individually fitted (as in FIG. 2B, where the fitting algorithm was applied to each frame individually). Should box 358 not be checked, non-uniform and individualized type fitting will occur for each frame of the group, but conveniently, will occur simultaneously on each frame in the group without the need to run the algorithm individually on each frame. From the standpoint of the disclosed algorithm, failing to check box 358 will essentially omit those portions of the algorithm shown in FIG. 7, i.e., the portions of the algorithm that sort through the best-individual-fit settings for each of the frames to determine the one best-group-fit setting for the fitting group for uniform scaling.

In a preferred embodiment, once grouped, the frames remain grouped even after type fitting. Accordingly, after group-based type fitting of the type disclosed, should a user decide to change a particular frame's type fitting parameters, such changes will ripple through the other frames in the group in a uniformly scaled fashion. Thus, if the user changes the font size of frame 410 (FIG. 4B) from 11.337 to 11 (a 2.97% reduction), the font sizes of frames 400 and 420 would also be scaled down by scaling factor of 2.97%. Of course, adjustment of such parameters after type-fitting runs the risk of overset text. Thus, if the user changes the font size of frame 410 from 11.337 to 11.5. (a 1.44% increase), application of this scaling factor to frame 420 may likely cause that frame to become overset. In this case, the text can be displayed as overset, or an error or alter message can be displayed to inform the user of this risk. Alternatively, such a change can cause the algorithm to automatically be rerun to see if a suitable group fitting solution can still be achieved. For example, if the user wishes for the font size to be 11.5 in frame 410, the algorithm can be rerun to see if this desire can be accommodated through uniform adjustment of the tracking or the otherwise next-highest priority attribute.

Because such post-type fitting modification can become a hindrance, the user can allow the once-grouped frames to be ungrouped through a suitable option on the interfaces 350 or 370 (not shown for clarity).

While the various frames disclosed herein have generally been represented as a unitary space appearing at a single location of a page layout, one skilled in the art will appreciate that a single frame may in fact appear in multiple places within a page layout. For example, in a dual column layout, a particular frame may begin at the bottom of a first column, and continue in a second column, allowing for text to spill between the two (such as with frame 450 as shown in FIG. 3A). Such a split frame 450 is commonly referred to as a story. Alternatively, a particular frame might likewise begin on one page of a page layout, and continue on another later page in the layout. As with a unitary frame, each of the subframes of the frame can be sized and spaced on the page layout in accordance with user preferences. Realizing this point, it is worth noting that the techniques for grouped type fitting disclosed herein are equally useable with such subframes, and can be so used in different ways. First, the subframes can be treated together and subjected to the same type fitting parameters, essentially treating both portions together as a unitary space. Alternatively, it may be useful in some embodiments to treat the subframes differently, and specifically to differently type-fit each subframe. In such a case, the disclosed technique can be modified to allow the user to define one or more subframes as individualized frames, and to group these subframes accordingly (with other frames or subframes) during type fitting. While such modifications to the disclosed technique are not illustrated, such modifications are easily achievable by one skilled in the art.

Although embodiments of the present disclosure are directed to type fitting text within text frames of a page layout application, it will be appreciated that the teachings of the present disclosure can apply to other forms of graphical objects (e.g., pictures or glyphs) appearing within a frame which might similarly need sizing or spacing optimization. Thus, "graphical objects" as used herein should be indicative of any such object (words, the letters in each word, pictures, glyphs, or otherwise) which lends itself to the sort of space or size fitting application disclosed herein.

Although the disclosed examples envision definition of a single level of groups of frames, it should be understood that the concept can be extended to the grouping of type-fitting groups. Thus, a second "superlayer" of groups could be made definable which would allow master fitting parameters to be applied across the fitting groups. In such a hierarchical system, each fitting group could have its own unique parameters applied to it (individual stories), but master fitting parameters can also be applied to the groups to achieve a desired aesthetic effect to potentially unify the look of an entire document.

The present disclosure amply illustrates to a computer programmer of skill how to make and use the disclosed algorithms, the accompanying user interfaces, and other functional aspects of the present disclosure. Therefore, programming such algorithms, accompanying user interfaces, and other functional aspects is a routine matter to a computer programmer of skill and can be accomplished using many different programming languages and within the context of many different operating systems. Of course, the disclosed algorithms, the accompanying user interfaces, and other functional aspects would be ultimately coded into a computer code and stored on a computer-readable media, such as a compact disc, a tape, stored in a volatile or non-volatile memory, etc.

While disclosed in the context of a traditional computer, it should be understood that the disclosed methods are not so limited. For example, the disclosed methods can have applicability with respect to other devices such as handheld devices (Personal Data Assistants, cell phones, etc.) and other multimedia devices (such as televisions, etc.).

As used in the claims, to "fit the graphical objects in each of the frames" does not necessarily imply that the objects fully fill each text frame within the pertinent group. As the reader will understand from the context of this disclosure, certain frames within a group can be fit even though the text (graphical objects) in a frame in the group does not fully fill the frame (e.g., frames 400 and 410 in FIG. 4B).

The foregoing description of preferred and other embodiments is not intended to limit or restrict the scope or applicability of the inventive concepts disclosed. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A method of fitting graphical objects within a plurality of separate graphical frames in a document, each frame being associated with at least one value associated with a fitting attribute for fitting one or more of the graphical objects in the frame, comprising:
   associating the separate frames within a group;
   using an algorithm to automatically determine an optimized at least one value, wherein using the algorithm comprises:
      determining a plurality of intermediate optimized values, wherein each intermediate optimized value is associated with a particular frame within the group; and
      selecting the optimized at least one value from said plurality of intermediate values; and
   applying the optimized at least one value to each frame in the group to fit one or more of the graphical objects in each of the frames without modifying the size of the frames in the group.

2. The method of claim 1, wherein said applying comprises: applying the optimized at least one value to a first frame in the group, and in response automatically applying the optimized at least one value to the other frames in the group.

3. The method of claim 2, wherein applying the optimized at least one value to the other frames in the group comprises scaling values of said other frames in accordance with a scaling factor determined based on the first frame.

4. The method of claim 1, wherein the graphical objects comprise text.

5. The method of claim 1, wherein the attribute is selected from the group consisting of at least one of font size, leading, tracking, kerning, spacing between paragraphs, spacing before and after text, vertical scaling and horizontal scaling.

6. The method of claim 1, further comprising, after associating the frames within a group, providing a visual cue to the frames in the group to distinguish the group from other groups.

7. The method of claim 6, wherein the visual cue comprises a unique color.

8. The method of claim 7, wherein the color is applied to each frame.

9. The method of claim 1, wherein associating the frames within a group comprises naming the group.

10. The method of claim 1, wherein optimizing the at least one value for each frame comprises determining a best fit for the at least one value for each frame.

11. The method of claim 10, wherein the best fit comprises a value which substantially fills the frame without overset.

12. The method of claim 10, wherein the best fit for the at least one value for each frame is uniformly scaled for each frame from original values.

13. The method of claim 1, wherein the algorithm receives as input a permissible range of variance for the at least one value.

14. The method of claim 1, wherein applying the optimized at least one value to its associated frame results in the graphical objects substantially filling each frame without overset.

15. The method of claim 1, wherein applying the optimized at least one value to its associated frame results in the graphical objects substantially filling only one frame without overset, with other frames being underset.

16. The method of claim 1, wherein optimizing the at least one value for each frame comprises determining a boundary between an underset and overset condition for each frame.

17. The method of claim 1, wherein optimizing the at least one value for each frame is accomplished in accordance with a priority assigned to each attribute for each frame.

18. The method of claim 1, wherein the algorithm excludes fitting of graphical objects having a determined style.

19. A method of fitting graphical objects within a plurality of separate graphical frames in a document, each frame being associated with at least one value associated with a fitting attribute for fining one or more of the graphical objects in the frame, comprising:
   specifying details concerning the values of the attributes for the frames in a user interface;
   using an algorithm to automatically determine an optimized at least one value, wherein using the algorithm comprises:
      determining a plurality of intermediate optimized values, wherein each intermediate optimized value is associated with a particular frame; and
      selecting the optimized at least one value from said plurality of intermediate values, wherein said selecting is based on the specified details; and
   applying the optimized at least one value to each frame of the plurality of separate graphical frames to fit one or more of the graphical objects in each of the frames without modifying the size of the plurality of separate graphical frames.

20. The method of claim 19, further comprising, after applying the optimized at least one value, modifying at least one value for one frame in the group, and in response automatically modifying that value in the other frames in the group.

21. The method of claim 20, wherein modifying that value in the other frames in the group occurs by scaling those values in accordance with a scaling factor as determined by the modified at least one value for the one frame.

22. The method of claim 19, wherein the details comprise a permissible range by which the at least one value may be modified during optimization.

23. The method of claim 19, wherein the graphical objects comprise text.

24. The method of claim 19, further comprising associating the frames within a group, and providing a visual cue to the frames in the group to distinguish the group from other groups.

25. The method of claim 19, wherein optimizing the at least one value for each frame comprises determining a best fit for the at least one value for each frame.

26. The method of claim 25, wherein the best fit comprises a value which substantially fills the frame without overset.

27. The method of claim 25, wherein the best fit for the at least one value for each frame is uniformly scaled for each frame from original values.

28. The method of claim 19, wherein applying the optimized at least one value to its associated frame results in the graphical objects substantially filling each frame without overset.

29. The method of claim 19, wherein applying the optimized at least one value to its associated frame results in the graphical objects substantially filling only one frame without overset, with other frames being underset.

30. The method of claim 19, wherein optimizing the at least one value for each frame comprises determining a boundary between an underset and overset condition for each frame.

31. The method of claim 19, wherein optimizing the at least one value for each frame is accomplished in accordance with a priority assigned to each attribute for each frame.

32. The method of claim 19, wherein the algorithm excludes fitting of graphical objects having a determined style.

33. A method of fitting graphical objects within a plurality of separate graphical frames in a document, each frame being associated with at least one fitting attribute with a value for fitting one or more of the graphical objects in the frame, comprising:

using an algorithm to automatically determine a common scaling factor for the value of the at least one fitting attribute in each of the separate frames; and applying the common scaling factor to scale at least one value in each frame of the plurality of separate graphical frames to fit one or more of the graphical objects in each of the frames, wherein said applying modifies the size of at least one graphical object in each of the plurality of separate graphical frames, wherein said applying is performed without modifying the size of the frames of said plurality of separate graphical frames, wherein at least one of the scaled values is different than another one of the scaled values.

34. The method of claim 33, further comprising, after applying the scaling factor, modifying at least one value for one frame in the group, and in response automatically modifying that value in the other frames in the group.

35. The method of claim 34, wherein modifying that value in the other frames in the group occurs by scaling those values in accordance with a second scaling factor as determined by the modified at least one value for the one frame.

36. The method of claim 33, wherein the graphical objects comprise text.

37. The method of claim 33, further comprising as a first step in the method associating the frames within a group.

38. The method of claim 37, further comprising, after associating the frames within a group, providing a visual cue to the frames in the group to distinguish the group from other groups.

39. The method of claim 33, wherein the algorithm determines a best-individual-fit for the at least one value for each frame individually.

40. The method of claim 39, wherein the best-individual-fit for the at least one value for each frame in the group comprises a value which substantially fills each frame without overset.

41. The method of claim 39, wherein determining the best-individual-fit for the at least one value for each frame comprises determining a boundary between an underset and overset condition for each frame.

42. The method of claim 39, wherein determining the best-individual-fit for the at least one value for each frame is accomplished in accordance with a priority assigned to each attribute for each frame.

43. The method of claim 39, wherein the algorithm further comprises automatically assessing the best-individual-fit values to determine the scaling factor.

44. The method of claim 43, wherein the scaling factor is determined by choosing the frame whose best-individual-fit for the at least one value most shrinks or least expands the graphical objects.

45. The method of claim 33, wherein the algorithm receives as input a permissible range of scaling for the at least one value.

46. The method of claim 33, wherein applying the scaling factor results in the graphical objects substantially filling only one frame without overset, with other frames being underset.

47. The method of claim 33, wherein the algorithm excludes fitting of graphical objects having a determined style.

48. A method of fitting graphical objects within a plurality of separate graphical frames in a document, each frame being associated with at least one fitting attribute with a value for fitting one or more of the graphical objects in the frame, comprising:

automatically determining an optimized value for the at least one attribute for each of the plurality of frames individually;

automatically assessing the optimized values to determine a common scaling factor for the at least one attribute based on a particular one of the optimized values; and scaling the values for the at least one attribute in each of the plurality of separate graphical frames by the common scaling factor to fit one or more of the graphical objects in each of the plurality of separate graphical frames, wherein said scaling modifies at least one graphical object within each of the plurality of separate graphical frames, wherein said scaling is performed without modifying the size of the frames in the plurality of separate graphical frame, wherein at least one of the scaled values is different than another one of the scaled values.

49. The method of claim 48, further comprising, after scaling the values, modifying at least one value for one frame in the group, and in response automatically modifying that value in the other frames in the group.

50. The method of claim 49, wherein modifying that value in the other frames in the group occurs by scaling those values in accordance with a second scaling factor as determined by the modified at least one value for the one frame.

51. The method of claim 48, wherein the graphical objects comprise text.

52. The method of claim 48, further comprising as a first step in the method associating the frames within a group.

53. The method of claim 52, further comprising, after associating the frames within a group, providing a visual cue to the frames in the group to distinguish the group from other groups.

54. The method of claim 48, wherein the at least one optimized value comprises a value which substantially fills its associated frame without overset.

55. The method of claim 48, wherein the at least one optimized value is derived for each frame by determining a boundary between an underset and overset condition for each frame.

56. The method of claim 48, wherein the at least one optimized value is derived in accordance with a priority assigned to each attribute for each frame.

57. The method of claim 48, wherein the algorithm receives as input a permissible range of scaling for the at least one value.

58. The method of claim 48, wherein scaling the values results in substantially filling only one frame without overset, with other frames being underset.

59. The method of claim 48, wherein determining the scaling factor is determined by selecting the frame whose at least one optimized value most shrinks or least expands the graphical objects.

60. The method of claim 48, wherein the algorithm excludes fitting of graphical objects having a determined style.

61. A method of fitting graphical objects within a plurality of separate graphical frames in an application, each frame being associated with at least one fitting attribute with a value for fitting one or more of the graphical objects in the frame, comprising:
    associating the frames within a group, the group having permissible variances by which each at least one value can be modified;
    receiving information specifying a change to a given value of a particular fitting attribute of a first frame of the group;
    modifying said given value for the first frame in the group in accordance with the specified change; and
    in response to that modification, automatically modifying corresponding values in multiple other frames in the group in accordance with a common scaling factor that is based on the change to said given value, wherein modifying said given value and modifying the corresponding values in the other frames in the group proportionally changes the size of at least one graphical object in each of the first frame and said other frames without changing the size of the frames of said plurality of separate graphical frames.

62. The method of claim 61, wherein modifying that value in the other frames in the group occurs by scaling those values in accordance with a scaling factor as determined by the modified at least one value for the one frame.

63. The method of claim 61, wherein the graphical objects comprise text.

64. The method of claim 61, further comprising, after associating the frames within a group, providing a visual cue to the frames in the group to distinguish the group from other groups.

65. The method of claim 61, wherein associating the frames within a group comprises naming the group.

66. The method of claim 61, further comprising using an algorithm to automatically optimize the at least one value for each frame in the group.

67. The method of claim 66, wherein automatically optimizing the at least one value for each frame in the group results in the graphical objects substantially filling each frame without overset.

68. The method of claim 66, wherein automatically optimizing the at least one value for each frame in the group results in the graphical objects substantially filling only one frame without overset, with other frames being underset.

69. The method of claim 66, wherein automatically optimizing the at least one value for each frame in the group comprises uniformly scaling the at least one value in each frame.

70. A computer-readable medium, containing a program for performing a method of fitting graphical objects within a plurality of separate graphical frames in a document, each frame being associated with at least one values associated with a fitting attribute for fitting one or more of the graphical objects in the frame, the method comprising:
    associating the separate frames within a group;
    using an algorithm to automatically determine an optimized at least one value, wherein using the algorithm comprises:
        determining a plurality of intermediate optimized values, wherein each intermediate optimized value is associated with a particular frame; and
        selecting the optimized at least one value from said plurality of intermediate values; and
    applying the optimized at least one value to each frame in the group to fit one or more of the graphical objects in each of the frames without modifying the size of the frames in the group.

71. The computer-readable medium of claim 70, wherein said applying comprises: applying the optimized at least one value to a first frame in the group, and in response automatically applying the optimized at least one value to the other frames in the group in accordance with a scaling factor determined based on the first frame.

72. The computer-readable medium of claim 70, further comprising, after associating the frames within a group, providing a visual cue to the frames in the group to distinguish the group from other groups.

73. The computer-readable medium of claim 70, wherein associating the frames within a group comprises naming the group.

74. The computer-readable medium of claim 70, wherein optimizing the at least one value for each frame comprises determining a best fit for the at least one value for each frame.

75. The computer-readable medium of claim 70, wherein applying the optimized at least one value to its associated frame results in the graphical objects substantially filling each frame without overset.

76. The computer-readable medium of claim 70, wherein applying the optimized at least one value to its associated frame results in the graphical objects substantially filling only one frame without overset, with other frames being underset.

77. The computer-readable medium of claim 70, wherein optimizing the at least one value for each frame comprises determining a boundary between an underset and overset condition for each frame.

78. A computer-readable medium, containing a program for performing a method of fitting graphical objects within a plurality of separate graphical frames in a document, each frame being associated with at least one value associated with a fitting attribute for fitting one or more of the graphical objects in the frame, the method comprising:
  specifying details concerning the values of the attributes for the frames in a user interface;
  using an algorithm to automatically determine an optimized at least one value, wherein using the algorithm comprises:
    determining a plurality of intermediate optimized values, wherein each intermediate optimized value is associated with a particular frame; and
    selecting the optimized at least one value from said plurality of intermediate values, wherein said selecting is based on the specified details; and
  applying the optimized at least one value to each frame of the plurality of separate graphical frames to fit one or more of the graphical objects in each of the frames without modifying the size of the plurality of separate graphical frames.

79. The computer-readable medium of claim 78, further comprising, after applying the optimized at least one value, modifying at least one value for one frame in the group, and in response automatically modifying that value in the other frames in the group in accordance with a scaling factor determined by the modified at least one value for the one frame.

80. The computer-readable medium of claim 78, wherein the details comprises a permissible range by which the at least one value may be modified during optimization.

81. The computer-readable medium of claim 78, further comprising, after associating the frames within a group, providing a visual cue to the frames in the group to distinguish the group from other groups.

82. The computer-readable medium of claim 78, wherein optimizing the at least one value for each frame comprises determining a best fit for the at least one value for each frame.

83. The computer-readable medium of claim 78, wherein applying the optimized at least one value to its associated frame results in the graphical objects substantially filling each frame without overset.

84. The computer-readable medium of claim 78, wherein applying the optimized at least one value to its associated frame results in the graphical objects substantially filling only one frame without overset, with other frames being underset.

85. The computer-readable medium of claim 78, wherein optimizing the at least one value for each frame comprises determining a boundary between an underset and overset condition for each frame.

86. A computer-readable medium containing a program for performing a method of fitting graphical objects within a plurality of separate graphical frames in a document, each frame being associated with at least one fitting attribute with a value for fitting one or more of the graphical objects in the frame, the method comprising:
  using an algorithm to automatically determine a common scaling factor for the value of the at least one fitting attribute in each of the separate frames; and
  applying the common scaling factor to scale at least one value in each frame of the plurality of separate graphical frames to fit one or more of the graphical objects in each of the frames, wherein said applying modifies the size of at least one graphical object in each of the plurality of separate graphical frames, wherein said applying is performed without modifying the size of the frames of said plurality of separate graphical frames, wherein at least one of the scaled values is different than another one of the scaled values.

87. The computer-readable medium of claim 86, further comprising, after applying the scaling factor, modifying at least one value for one frame in the group, and in response automatically modifying that value in the other frames in the group in accordance with a second scaling factor determined by the modified at least one value for the one frame.

88. The computer-readable medium of claim 86, further comprising as a first step in the method associating the frames within a group.

89. The computer-readable medium of claim 88, further comprising, after associating the frames within a group, providing a visual cue to the frames in the group to distinguish the group from other groups.

90. The computer-readable medium of claim 86, wherein the algorithm determines a best-individual-fit for the at least one value for each frame individually.

91. The computer-readable medium of claim 90, wherein determining the best-individual-fit for the at least one value for each frame comprises determining a boundary between an underset and overset condition for each frame.

92. The computer-readable medium of claim 90, wherein the algorithm further comprises automatically assessing the best-individual-fit values to determine the scaling factor.

93. The computer-readable medium of claim 92, wherein the scaling factor is determined by choosing the frame whose best-individual-fit for the at least one value most shrinks or least expands the graphical objects.

94. The computer-readable medium of claim 86, wherein applying the scaling factor results in the graphical objects substantially filling only one frame without overset, with other frames being underset.

95. A computer-readable medium containing a program for performing a method of fitting graphical objects within a plurality of separate graphical frames in a document, each frame being associated with at least one fitting attribute with a value for fitting one or more of the graphical objects in the frame, the method comprising:
  automatically determining an optimized value for the at least one attribute for each of the plurality of frames individually;
  automatically assessing the optimized values to determine a common scaling factor for the at least one attribute based on a particular one of the optimized values; and
  scaling the values for the at least one attribute in each of the plurality of separate graphical frames by the common scaling factor to fit one or more of the graphical objects in each of the plurality of separate graphical frames, wherein said scaling modifies at least one graphical object within each of the plurality of separate graphical frames, wherein said scaling is performed without modifying the size of the frames in the plurality of separate graphical frames, wherein at least one of the scaled values is different than another one of the scaled values.

96. The computer-readable medium of claim 95, further comprising, after scaling the values, modifying at least one value for one frame in the group, and in response automatically modifying that value in the other frames in the group in accordance with a second scaling factor determined by the modified at least one value for the one frame.

97. The computer-readable medium of claim 95, further comprising as a first step in the method associating the frames within a group.

98. The computer-readable medium of claim 97, further comprising, after associating the frames within a group, providing a visual cue to the frames in the group to distinguish the group from other groups.

99. The computer-readable medium of claim 95, wherein the at least one best-individual-fit value comprises a value which substantially fills its associated frame without overset.

100. The computer-readable medium of claim 95, wherein the at least one best-individual-fit value is derived for each frame by determining a boundary between an underset and overset condition for each frame.

101. The computer-readable medium of claim 95, wherein scaling the values results in substantially filling only one frame without overset, with other frames being underset.

102. The computer-readable medium of claim 95, wherein determining the scaling factor is determined by selecting the frame whose at least one best-individual-fit value most shrinks or least expands the graphical objects.

103. A computer-readable medium containing a program for performing a method of fitting graphical objects within a plurality of separate graphical frames in an application, each frame being associated with at least one fitting attribute with a value for fitting one or more of the graphical objects in the frame, the method comprising:
associating the frames within a group, the group having permissible variances by which each at least one value can be modified;
receiving information specifying a change to a given value of a particular fitting attribute of a first frame of the group;
modifying said given value for the first frame in the group in accordance with the specified change; and
in response to that modification, automatically modifying corresponding values in multiple other frames in the group in accordance with a common scaling factor that is based on the change to said given value, wherein modifying said given value and modifying the corresponding values in the other frames in the group proportionally changes the size of at least one graphical object in each of the first frame and said other frames without changing the size of the frames of said plurality of separate graphical frames.

104. The computer-readable medium of claim 103, wherein modifying that value in the other frames in the group occurs by scaling those values in accordance with a scaling factor determined by the modified at least one value for the one frame.

105. The computer-readable medium of claim 103, further comprising, after associating the frames within a group, providing a visual cue to the frames in the group to distinguish the group from other groups.

106. The computer-readable medium of claim 103, wherein associating the frames within a group comprises naming the group.

107. The computer-readable medium of claim 103, further comprising using an algorithm to automatically optimize the at least one value for each frame in the group.

108. The computer-readable medium of claim 107, wherein automatically optimizing the at least one value for each frame in the group results in the graphical objects substantially filling each frame without overset.

109. The computer-readable medium of claim 107, wherein automatically optimizing the at least one value for each frame in the group results in the graphical objects substantially filling only one frame without overset, with other frames being underset.

110. The computer-readable medium of claim 107, wherein automatically optimizing the at least one value for each frame in the group comprises uniformly scaling the at least one value in each frame.

* * * * *